(12) United States Patent  (10) Patent No.: US 9,342,386 B1
Sargent  (45) Date of Patent: May 17, 2016

(54) MESSAGING CHANNEL FOR WEB PAGES, EXTENSIONS, AND APPLICATIONS TO COMMUNICATE

(71) Applicant: GOOGLE INC., Mountain View, CA (US)

(72) Inventor: Antony John Sargent, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/019,502

(22) Filed: Sep. 5, 2013

(51) Int. Cl.
*G06F 9/54* (2006.01)

(52) U.S. Cl.
CPC ....................................... *G06F 9/546* (2013.01)

(58) Field of Classification Search
None
See application file for complete search history.

(56) References Cited

U.S. PATENT DOCUMENTS

| | | | | |
|---|---|---|---|---|
| 8,176,321 | B1* | 5/2012 | Perry et al. .................... | 713/167 |
| 2006/0010196 | A1* | 1/2006 | Laird et al. ........ | G06F 17/30873 709/203 |
| 2006/0143340 | A1* | 6/2006 | Labar .............................. | 710/62 |
| 2007/0136579 | A1* | 6/2007 | Levy et al. ............ | H04L 63/102 713/168 |
| 2007/0277109 | A1* | 11/2007 | Chen et al. ................ | G06F 8/20 715/733 |
| 2009/0216795 | A1* | 8/2009 | Cohen et al. ................... | 707/102 |
| 2009/0288098 | A1* | 11/2009 | Abd-El-Malek et al. ..... | 719/312 |
| 2010/0005527 | A1* | 1/2010 | Jeon ..................... | G06F 17/3089 726/22 |
| 2011/0125899 | A1* | 5/2011 | Yamamoto ..................... | 709/225 |
| 2014/0047433 | A1* | 2/2014 | Gaither et al. ............ | G06F 8/61 717/176 |

OTHER PUBLICATIONS

Google's Internet Identity Research, U2F: Universal 2nd Factor, retrieved from https://sites.google.com/site/oauthgoog/gnubby, dated Sep. 3, 2013, 1 page.
Technical Q&A QA1629, Launching the App Store from an iPhone application, retrieved from developer.apple.com/library/ios/#qa/qa1629/_index.html, dated Sep. 5, 2013, 3 pages.

\* cited by examiner

*Primary Examiner* — Tuan Dao
(74) *Attorney, Agent, or Firm* — Brake Hughes Bellerman LLP

(57) ABSTRACT

A web page itself, unmodified by any injected content script, may communicate with installed extensions or installed packaged applications. A web page initiates a request for a browser extension or a web application via a messaging channel provided by the web browser. A system determines if a URL of the web page matches a pattern specified by a manifest file of the browser extension or the web application, and sends the request to a browser extension or a web application if the URL of the web page matches the pattern.

15 Claims, 6 Drawing Sheets

```
"externally_connectable": {
  "matches": ["*://*.example.com/*"]
}
```
210

```
// The ID of the extension we want to talk to.

var editorExtensionId = "abcdefghijklmnoabcdefhijklmnoabc";

// Make a request:

c.runtime.sendMessage(editorExtensionId, {openUrlInEditor: url},
  function(response) {
    if (!response.success)
      handleError(url);
});
```
220

FIG. 2

```
c.runtime.onMessageExternal.addListener(
  function(request, sender, sendResponse) {
    if (sender.url == blacklistedWebsite)
      return;  // don't allow this web page access
    if (request.openUrlInEditor)
      openUrl(request.openUrlInEditor);
});
```

MESSAGING CHANNEL FOR WEB PAGES, EXTENSIONS, AND APPLICATIONS TO COMMUNICATE

TECHNICAL FIELD

This application generally relates to web technology, and more particularly, to message passing between web pages, browser extensions, and web applications.

BACKGROUND

Web browsers implemented on a web-enabled computing device allow users to access all kinds of content. Web browsers are configured to read programmatic code and render that code as web pages, which may include rendering both audio and visual content contained in various media files (e.g., image, video and audio files), as well as performing other functions defined in the programmatic code. Web pages are generally implemented using programming languages such as HTML (including HTML5), CSS and JavaScript, among a number of other available programming languages.

Some browsers allow users to install add-ons (or extensions) to the browser, where such extensions add functionality to the browser and operate as an integrated part of the browser. For instance, an extension may provide a user access to its additional functionality by modifying a user-interface (UI) of the browser. As an example, a weather forecast extension may be added to a browser, where the extension provides easy access to weather information by adding an icon or a button to the UI of the browser. A user may then interact with the extension's button or icon (e.g., by clicking it or hovering over it with a pointing device) to obtain weather information, rather than having to browse to a weather related web page in order to obtain weather information.

Browser extensions may be implemented using programmatic code that is written using the same programming languages that are used for implementing web pages, such as JavaScript. From a browser's perspective, extensions effectively function as web pages that are an integrated part of the browser once they are installed. By installing extensions that are of interest to him or her, a user can effectively create a custom browser that includes the functionality of the extensions they choose to install.

Web applications are bundled applications that a user downloads, which may be used to perform some functionality for the user.

It may be useful for web pages, extensions, and web applications to exchange messages, while maintaining a user's privacy and security.

SUMMARY

A web page itself, unmodified by any injected content script, may communicate with installed extensions or installed packaged applications. A system allows web pages to send messages to web applications or browser extensions using a messaging channel. Web applications can also use the messaging channel to communicate directly with other web applications, browser extensions, or web pages.

In one implementation, a web page initiates a request for a browser extension or a web application via a messaging channel provided by the web browser. A method determines if a URL of the web page matches a pattern specified by a manifest file of the browser extension or the web application, and sends the request to a browser extension or a web application if the URL of the web page matches the pattern.

Other implementations of this aspect include corresponding systems, apparatus, and computer programs, configured to perform the actions of the methods, encoded on computer storage devices.

In another implementation, a method includes automatically detecting, via an installed web application, an input from a peripheral device connected to a computing device; automatically uploading the input to a web page; sending a message from the web page via a messaging channel to the installed web application; receiving a response to the message via the messaging channel; and authenticating a user to the webpage using the response. The peripheral device may be, for example, a USB security device.

Other implementations of this aspect include corresponding systems, apparatus, and computer programs, configured to perform the actions of the methods, encoded on computer storage devices.

In another implementation, means for automatically detecting an input from a peripheral device connected to a computing device are provided. Means for automatically uploading the input to a web page are provided. Means for sending a message from the web page via a messaging channel to the installed web application, and means for receiving a response to the message are provided. Means for authenticating a user to the webpage using the response are provided.

The details of one or more implementations are set forth in the accompanying drawings and the description below. Other features will be apparent from the description and drawings, and from the claims.

A system and method for message passing between web pages, extensions, and web applications, substantially as shown in or described in connection with at least one of the figures, is set forth more completely in the claims.

BRIEF DESCRIPTION OF THE DRAWINGS

FIG. 2 is an example portion of code for a manifest file in accordance with an example implementation.

FIG. 3 is an example portion of code for a listener.

Like reference symbols in the various drawings indicate like elements.

DETAILED DESCRIPTION

Figure 1:
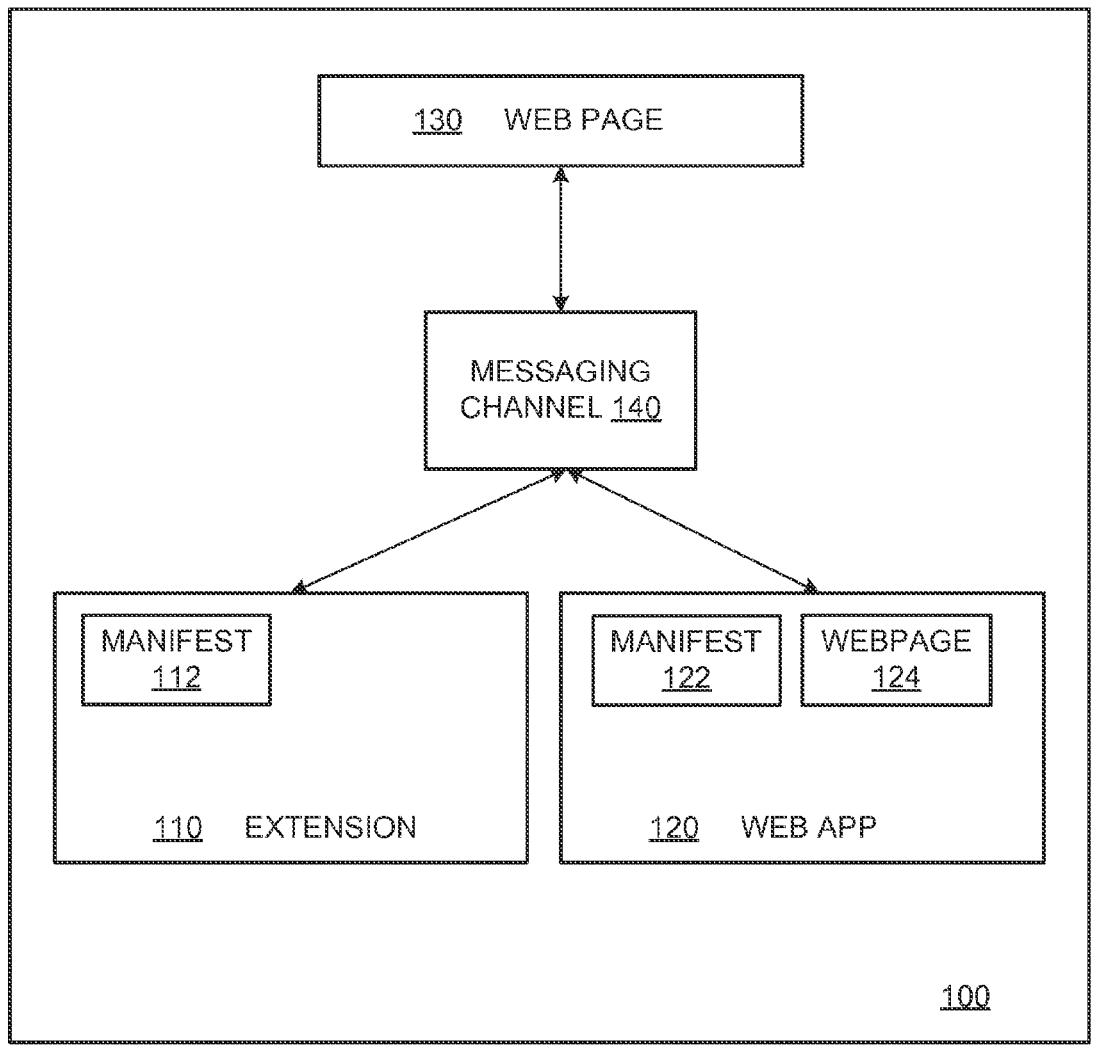
FIG. 1 is a block diagram illustrating an exemplary web browser that implements extension messaging using the browser as an intermediary.

A web browser executed by a client device can receive code (e.g., HTML code) from a remote server (e.g., a remote server that hosts a website) and can execute the received code on the client device for the benefit of a user of the client device.

In various implementations, the web browser may include or have installed one or more web applications. In this context, a "web application" may be configured to perform a single task or multiple tasks for a user. In such an implementation, the web application may be configured to be executed or interpreted by the web browser. Thus, web applications can be run inside a browser with a dedicated user interface, and may provide functionality and an experience that is more rich and interactive than a standalone website but are less cumbersome and monolithic than a desktop application. Examples of web applications include games, photo editors, and video players that are run inside the browser.

Web applications can be "hosted web applications," or "packaged web applications." Hosted web applications can grant a small number of additional permissions to a specific website, such as the ability to use more than the normal quota of temporary storage space, use geolocation features without additional confirmation prompts beyond a single install-time one, and the ability to always have a hidden page open which is performing tasks such as synchronizing data for offline use or receiving server-pushed notifications to display to the user. They also get special treatment in a user interface, in that they may be shown with a large icon that can be clicked to launch the application either in a tab or in a standalone (possibly full screen) window.

Installable web applications are a way of making a browser treat certain websites like applications. Many installable web applications are hosted web applications with extra metadata (such as a small manifest file that describes the application). Packaged web applications are a type of installable web applications. Packaged applications can be thought of as web applications whose code is bundled, so that the user can download all of the content of the web application for execution by the browser or in a standalone window. A packaged web application may not need to have network access to perform its functionality for the user, and rather may be executed successfully by the browser locally on the computing device without access to a network. Packaged web applications have the option of using extension application programming interfaces (APIs), allowing packaged apps to change the way the browser behaves or looks. In some cases, packaged web applications may operate without appearing to run in a browser, e.g., without the browser "chrome", tabs, or other user interface of the browser. In such a case, the packaged web applications would operate in a standalone window without access to content scripts or APIs related to browser state such as cookies, history, bookmarks, open tabs, etc. In various cases, packaged web applications may access USB drives, BLUETOOTH devices, open raw network sockets, act as servers, or access the local filesystem, as examples.

In various examples, the web browser may include or be configured to interact with one or more browser extensions. In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JavaScript, and CSS. Extensions may have little or no user interface. In some implementations, extensions may provide a small user interface icon or other user interface that may modify a browser's "chrome", which is defined herein to include an area outside of a webpage displayed in the browser (such as the borders of a web browser window, which include the window frames, menus, toolbars and scroll bars). Selecting the icon or the other user interface may activate the functionality of the extension within the browser.

Thus, browser extensions also provide extra functionality to a browser, but generally, unlike web applications, there is little or no user interface component to the functionality provided by an extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page.

Extensions may modify websites, for example to block advertisements, to increase a zoom level on pages, or read strings of text and pass those to a text to speech engine for a blind user. A developer may want injected code from an extension to communicate to the rest of the extension. For example, an extension may remove all images from a news website. The extension may establish a communication channel back to the rest of the extension running in its own process in the browser, using a content script. Because content scripts run in the context of a web page and not the extension, they often need some way of communicating with the rest of the extension. For example, an RSS reader extension might use content scripts to detect the presence of an RSS feed on a page, then notify the background page in order to display a page action icon for that page. Communication between extensions and their content scripts works by using message passing. Either side can listen for messages sent from the other end, and respond on the same channel. A message can contain any valid object (e.g., a JSON object such as null, boolean, number, string, array, or object).

"Packaged web applications", in contrast to browser extensions, may look and feel like regular web applications, with a big-screen design and rich user interface. Both extensions and packaged web applications may bundle all their files into a single file that a user downloads and installs. This bundling means that, unlike ordinary web applications, extensions and packaged web applications do not need to depend on content from the web. Browser extensions, packaged web applications, and installable web applications may be distributed via a trusted web store, or via individual websites.

FIG. 1 is a block diagram illustrating a web browser 100 that implements messaging using a messaging channel, in accordance with an example implementation. The browser 100 may be implemented in a computing device, such as the computing devices shown and described with respect to FIG. 6 below. As shown in FIG. 1, the browser 100 may be used to implement a first extension process, extension 110, and a web application 120, as well as a web page 130. In the browser 100, the extension 110, the web application 120, and the web page 130 are implemented such that they are functionally isolated from each other, so as to reduce the risks associated with running extensions or applications in an open execution environment. In this example, each of the extension 110 and web application 120 and web page 130 may communicate with each other via a messaging channel 140 of the browser 100.

The extension 110 may include a manifest file 112. The web application may also include a manifest file 122 and at least one web page 124. The web page 124 is different from the web page 130. The manifest file 112 and the manifest file 122 may include metadata describing the extension or web application (such as a name, version, title, description, permissions, etc.), and may be in a JSON or other format.

As discussed in more detail below with respect to FIG. 2, an extension or web application can receive and respond to messages from regular web pages if it has specified in its manifest file which web sites it can communicate with or receive messages from. This may expose the messaging channel 140 to, for example, any web page which matches the URL patterns specified in the manifest file of the browser extension or web application.

A web page itself, unmodified by any injected content script, may communicate with installed extensions or installed packaged applications. Advantages of this approach include, for example, that extensions do not have to inject a content script, which can be a security and a privacy benefit for users. Instead of users needing to grant the extension the ability to read and modify the content of all web pages the content script would be injected into, it instead passively can wait for websites that opt-in, to connect to the extension. Moreover, the web page itself can communicate with an installed packaged application that operates in a standalone window.

The messaging channel 140 may operate as one or more public messaging application programming interface(s) (API) that is configured to mediate messages and that allows for communication between the web page 130 and one or more of the extension 110 or the web application 120, for example. The messaging channel 140 may also operate to mediate messages exchanged between two web applications, or between a web application and an extension. The API(s) may be synchronous, or they may be asynchronous such that they return immediately without waiting for the operation to finish. While only one extension 110, one web application 120, and one web page 130 are shown and described in FIG. 1, it will be appreciated that additional extensions, web pages, messaging channels, or web applications may be implemented in the browser 100, and the techniques described herein would apply equally to those additional extensions or applications.

FIG. 2 is an example portion of code for a manifest file in accordance with an example implementation. The example implementation shown and discussed with respect to FIG. 2 is for illustrative purposes only, and is not meant to limit the described methods and systems. As examples, the described systems and methods may be implemented using web applications or browser extensions related to games, videos, weather, finance, productivity, social, business, entertainment, news, computer programming, or any other web application, browser extension, or combination thereof. Any type and number of web application(s) and/or browser extension(s) may be utilized to implement the systems and methods described herein.

As shown in FIG. 2, a declaration 210 may be included in a manifest file of a web application or a browser extension. The declaration may include one or more URL patterns. The example includes a pattern for "*.//*.example.com/*, which may be a second-level domain rather than a top-level domain. For example, in "example.com", "example" is the second-level domain of the ".com" top-level domain.

The code 220 may be used to send a message to an extension or web application. The code 220 may include an identifier for the extension the web page wants to message, which may be a unique alpha-numeric string, for example. The code 220 may also include at least one request. In this example, the code 220 includes a request to open a URL in an editor. If there is an error, the web page may handle the error. In some examples, only the web page can initiate a request for communication.

FIG. 3 is an example portion of code for a listener. An application or extension may listen for messages from web pages via the messaging channel shown in FIG. 1 or via other APIs. The example code 310 includes a listener for a message from a web page. In some cases, extensions or web pages can exclude certain web pages or patterns of web pages from sending them messages, for example using a blacklist. If a sender URL is one of a blacklisted set of URLs or matches a pattern of blacklisted URLs, the extension or web application can refuse that web page from access to the extension or web application.

Figure 4:
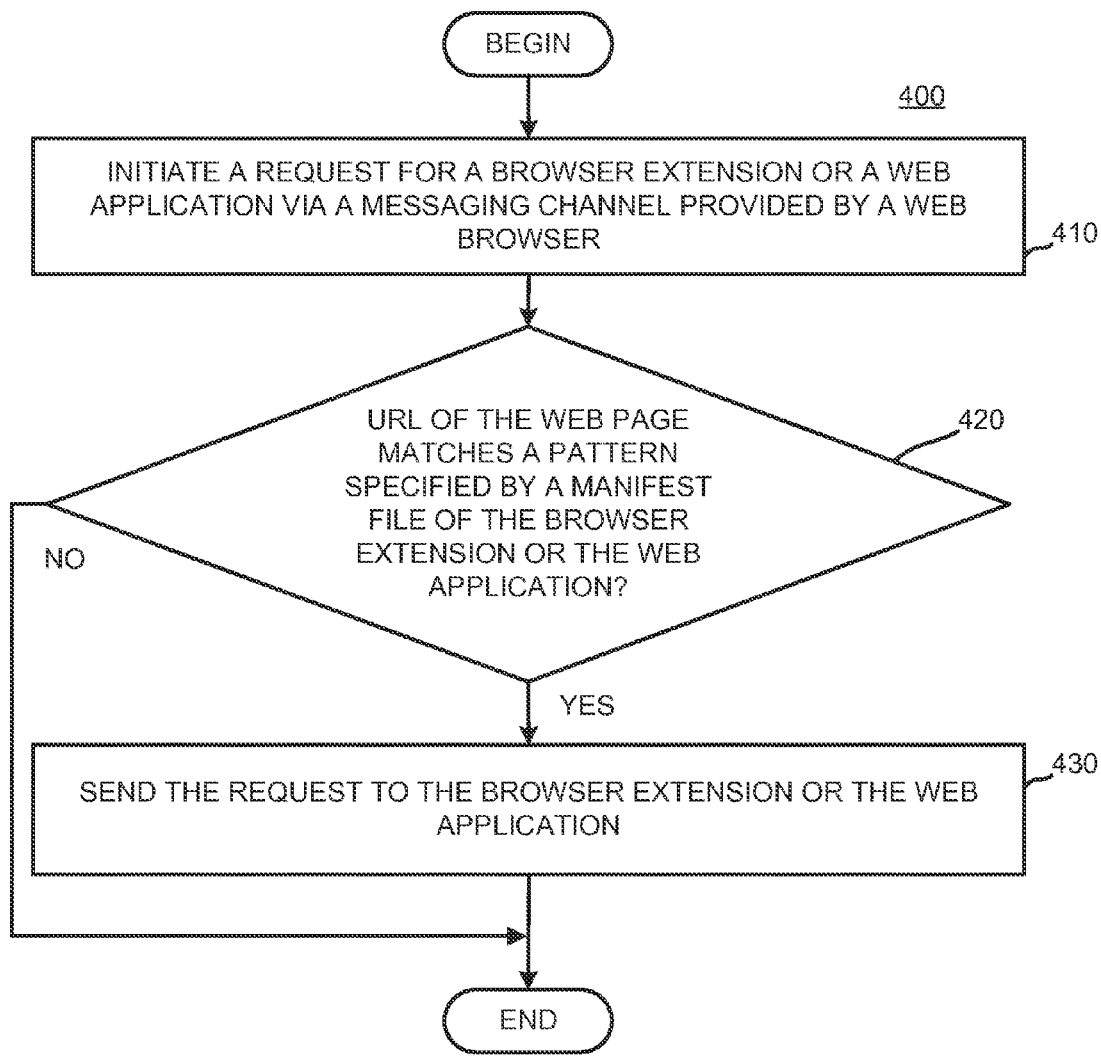
FIG. 4 is a flowchart illustrating a method for messaging using a messaging channel.

FIG. 4 is a flowchart illustrating a method for messaging using a messaging channel. The process 400 shown in FIG. 4 may be performed at least in part by a browser of a computer device, for example the browser 100 shown in FIG. 1, using a messaging channel. As shown in FIG. 1, a web page may initiate a request to a browser extension or a web application via a messaging channel provided by the web browser (410). In some examples, the web page may specify a particular browser extension or web application using a unique identifier. The system may determine if the URL of the web page matches a pattern specified by a manifest file of the browser extension or the web application (420). If so (420, yes) the system may send the request to the browser extension or the web application.

Figure 5:
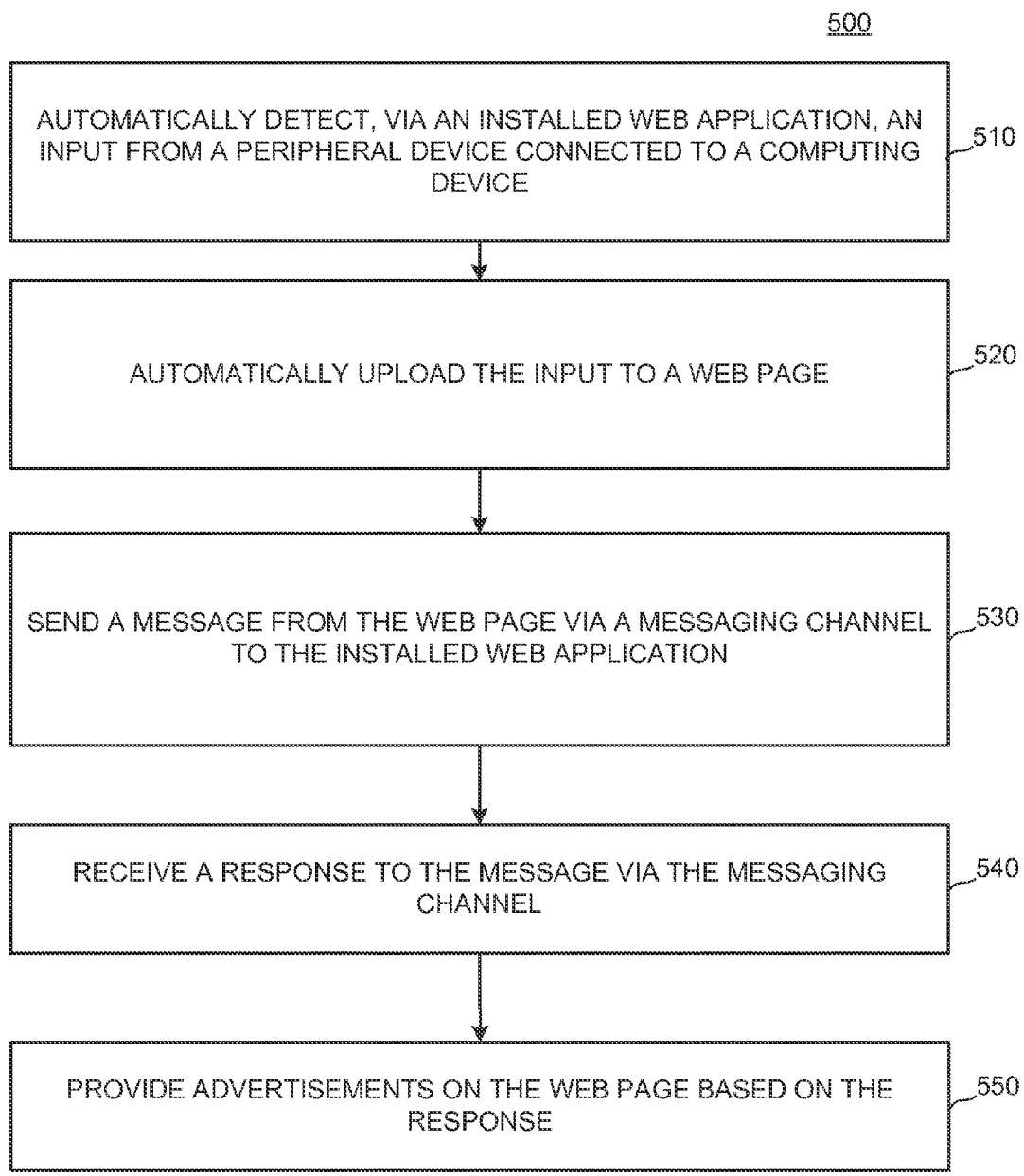
FIG. 5 is a flowchart illustrating a method for messaging using the messaging channel, in accordance with an example implementation.

FIG. 5 is a flowchart illustrating a method for messaging using the messaging channel, in accordance with an example implementation. The process 500 shown in FIG. 5 may be performed at least in part by a processor of a computer device. The processor may automatically detect, via an installed web application, an input from a peripheral device connected to a computing device (510). The processor may automatically upload the input to a web page (520). The web page may send a message from the web page via a messaging channel to the installed web application (530). The web page may receive a response to the message via the messaging channel (540). The web page may provide advertisements on the web page based on the response (550).

As one example, a user inputs a graphic card into a desktop computer. The computer, using an installed web application, may automatically detect the photos and automatically upload the photos to a photo storage website. The website may use a messaging channel to communicate with the installed web application. For example, the website may query the installed web application using the messaging channel, to see if the installed web application is installed for a particular user. The website may receive a response, via the messaging channel, that the application is installed. Upon determining that the web application is installed, the website may prevent certain promotional advertisements related to photo storage from being displayed to the user (such as "install this photo web application" because the user has already installed the photo web application). As another example, the website may select other more appropriate custom advertisements for presentation to the user.

As yet another example, a photo storage website may be notified by an installed web application that some photos are pending upload on the local device, and the website may prompt the user to upload the photos via the website when the user accesses the website.

As yet another example, a user may utilize a USB-connected "2nd factor" security device that is registered with a website's back-end account system. During a login process for that website, the login webpage can try sending a message to a locally installed application that communicates with the USB security device to perform cryptographic operations and return a result to the webpage. The result can be submitted to a server (e.g., by the webpage), along with the username/password combination (e.g., entered by a user). The process may serve as a stronger authentication mechanism for websites. In some implementations, the result can be used to determine a level of access for the user, for example in combination with the username/password combination.

Figure 6:
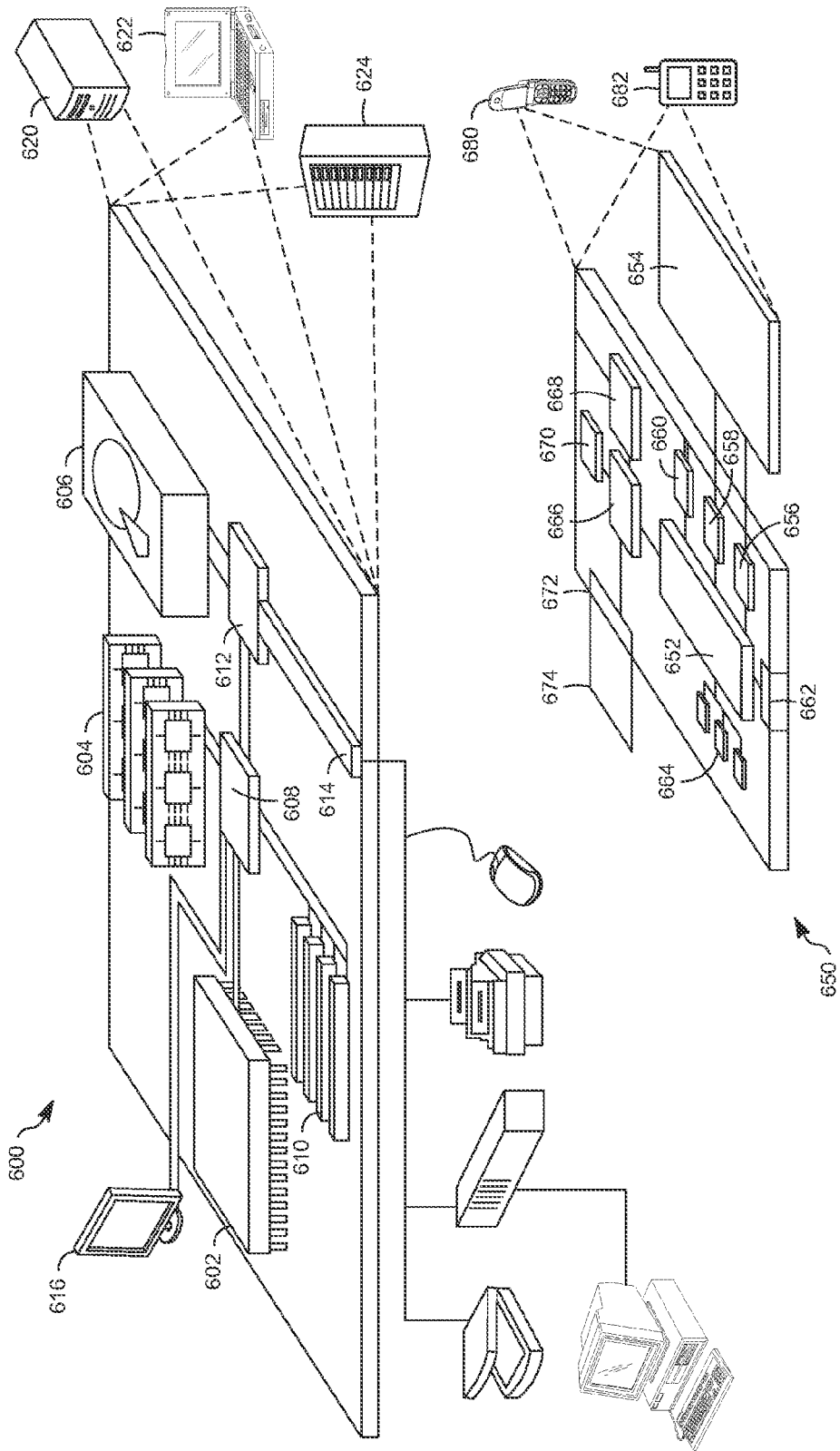
FIG. 6 is a diagram illustrating a computing device and a mobile computing device that can be used to implement the techniques described herein in accordance with an example embodiment.

FIG. 6 is a diagram that shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, which may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for mediating messages using a web browser of a computing device, the method comprising:
   initiating a request for a browser extension or a web application by a web page via a messaging channel provided by the web browser, wherein the browser extension is installed in a browser executing on a local client computing device, and wherein the web application is a packaged web application, whose code is bundled for downloading to a local client computing device and for execution of the downloaded code by a browser running on the local client computing device, the request including an identifier of the browser extension or the web application;
   listening, by the browser extension or the web application, for the request via the messaging channel;
   determining if a URL of the web page matches a pattern specified by a manifest file of the browser extension or the web application, the browser extension and the web application each being separately packaged as an installable bundle of files including the manifest file and at least one HTML file; and
   sending the request to a browser extension or a web application if the URL of the web page matches the pattern and not sending the request if the URL of the web page does not match the pattern.

2. The method of claim 1, further comprising:
- determining, by the browser extension or the web application, if the web page is one of a set of blacklisted pages; and
- rejecting, by the browser extension or the web application, the request if the web page is one of the set of blacklisted pages.

3. The method of claim 1, wherein the browser extension implements a first extension process isolated from a second process that is implemented by the web page.

4. The method of claim 1, wherein the web application implements a first process isolated from a second process that is implemented by the web page.

5. The method of claim 1, further comprising:
- sending a response to the request from the browser extension or the web application.

6. A system comprising:
- a memory; and
- a processor operably coupled to the memory and configured to execute code to:
  - initiate a request for a browser extension or a web application by a web page via a messaging channel provided by a web browser, wherein the browser extension is installed in a browser executing on a local client computing device, and wherein the web application is a packaged web application, whose code is bundled for downloading to a local client computing device and for execution of the downloaded code by a browser running on the local client computing device, the request including an identifier of the browser extension or the web application;
  - listen, by the browser extension or the web application, for the request via the messaging channel;
  - determine if a URL of the web page matches a pattern specified by a manifest file of the browser extension or the web application, the browser extension and the web application each being separately packaged as an installable bundle of files including the manifest file and at least one HTML file; and
  - send the request to a browser extension or a web application if the URL of the web page matches the pattern and not sending the request if the URL of the web page does not match the pattern.

7. The system of claim 6, the processor further configured to execute the code to:
- determine, by the browser extension or the web application, if the web page is one of a set of blacklisted pages; and
- reject, by the browser extension or the web application, the request if the web page is one of the set of blacklisted pages.

8. The system of claim 6, wherein the browser extension implements a first extension process isolated from a second process that is implemented by the web page.

9. The system of claim 6, wherein the web application implements a first process isolated from a second process that is implemented by the web page.

10. The system of claim 6, the processor further configured to execute the code to:
- send a response to the request from the browser extension or the web application.

11. A non-transitory computer-readable storage medium having instructions recorded and stored thereon, the instructions, when executed by a computing device, cause the computing device to:
- initiate a request for a browser extension or a web application by a web page via a messaging channel provided by a web browser, wherein the browser extension is installed in a browser executing on a local client computing device, and wherein the web application is a packaged web application, whose code is bundled for downloading to a local client computing device and for execution of the downloaded code by a browser running on the local client computing device, the request including an identifier of the browser extension or the web application;
- listen, by the browser extension or the web application, for the request via the messaging channel;
- determine if a URL of the web page matches a pattern specified by a manifest file of the browser extension or the web application, the browser extension and the web application each being separately packaged as an installable bundle of files including the manifest file and at least one HTML file; and
- send the request to a browser extension or a web application if the URL of the web page matches the pattern and not sending the request if the URL of the web page does not match the pattern.

12. The non-transitory computer-readable storage medium of claim 11, wherein the instructions, when executed by the computing device, further cause the computing device to:
- determine, by the browser extension or the web application, if the web page is one of a set of blacklisted pages; and
- reject, by the browser extension or the web application, the request if the web page is one of the set of blacklisted pages.

13. The non-transitory computer-readable storage medium of claim 11, wherein the browser extension implements a first extension process isolated from a second process that is implemented by the web page.

14. The non-transitory computer-readable storage medium of claim 11, wherein the web application implements a first process isolated from a second process that is implemented by the web page.

15. The non-transitory computer-readable storage medium of claim 11, wherein the instructions, when executed by the computing device, further cause the computing device to:
- send a response to the request from the browser extension or the web application.

* * * * *